US012789495B2

(12) United States Patent
Wetsch et al.

(10) Patent No.: US 12,789,495 B2
(45) Date of Patent: Nov. 10, 2026

(54) DUNNAGE APPARATUS WITH STATIC REMOVER

(71) Applicant: Pregis LLC, Chicago, IL (US)

(72) Inventors: Thomas D. Wetsch, Naples, FL (US); Eric Charles Wright, Bollingbrook, IL (US)

(73) Assignee: Pregis LLC, Chicago, IL (US)

( * ) Notice: Subject to any disclaimer, the term of this patent is extended or adjusted under 35 U.S.C. 154(b) by 138 days.

(21) Appl. No.: 18/047,177

(22) Filed: Oct. 17, 2022

(65) Prior Publication Data

US 2023/0129170 A1 Apr. 27, 2023

Related U.S. Application Data

(63) Continuation of application No. 15/592,646, filed on May 11, 2017, now Pat. No. 11,472,151.

(51) Int. Cl.
*B31D 5/00* (2017.01)
*H05F 3/02* (2006.01)

(52) U.S. Cl.
CPC ............. *B31D 5/0052* (2013.01); *H05F 3/02* (2013.01); *B31D 2205/0035* (2013.01); *B31D 2205/0047* (2013.01); *B31D 2205/0058* (2013.01); *B31D 2205/0082* (2013.01); *B31D 2205/0094* (2013.01)

(58) Field of Classification Search
CPC .......... B31D 5/0052; B31D 2205/0035; B31D 2205/0047; B31D 2205/0058; B31D 2205/0082; B31D 2205/0094; H05F 3/02
USPC ........................................... 193/352; 493/352
See application file for complete search history.

(56) References Cited

U.S. PATENT DOCUMENTS 2,023,321 A 12/1935 Gutman
3,757,164 A * 9/1973 Binkowski ................ H05F 3/02 361/221
4,806,410 A 2/1989 Armington et al.
6,527,147 B2 3/2003 Wehrmann
6,647,242 B2 11/2003 Gagnon et al.
7,955,245 B2 6/2011 Cheich et al.
7,992,615 B2 * 8/2011 Kim ..................... B31D 5/0073 156/581
8,016,735 B2 9/2011 Wetsch et al.
8,900,111 B2 12/2014 Wetsch et al.
9,254,578 B2 2/2016 Wetsch et al.
(Continued)

FOREIGN PATENT DOCUMENTS

CN 204518202 U 7/2015
JP S5294379 U 7/1977
(Continued)

OTHER PUBLICATIONS

International Search Report and Written Opinion mailed Sep. 2, 2018 for International Application No. PCT/US2018/032386, filed May 11, 2018.

*Primary Examiner* — Lucas E. A. Palmer
(74) *Attorney, Agent, or Firm* — Fox Rothschild LLP

(57) ABSTRACT

Provided is a dunnage apparatus, comprising a converting station and a static remover. The converting station converts a line of high-density stock material into low density dunnage and moves the dunnage along a material path in a downstream direction. The static remover is electrically grounded and contacts the dunnage to thereby remove static buildup from the material.

21 Claims, 10 Drawing Sheets

(56) References Cited

U.S. PATENT DOCUMENTS

| | | | |
|---|---|---|---|
| 11,034,121 | B2 | 6/2021 | Wetsch et al. |
| 2003/0092552 | A1 | 5/2003 | Armington et al. |
| 2009/0258775 | A1 | 10/2009 | Chan et al. |
| 2009/0321020 | A1 | 12/2009 | Kim |
| 2011/0052875 | A1 | 3/2011 | Wetsch et al. |
| 2011/0053742 | A1* | 3/2011 | Wetsch ................ B31D 5/0052 493/27 |
| 2012/0165172 | A1 | 6/2012 | Wetsch et al. |
| 2012/0225765 | A1 | 9/2012 | Cheich et al. |
| 2013/0092716 | A1 | 4/2013 | Wetsch et al. |
| 2015/0126351 | A2 | 5/2015 | Wetsch et al. |
| 2017/0021585 | A1 | 1/2017 | Wetsch et al. |

FOREIGN PATENT DOCUMENTS

| | | | |
|---|---|---|---|
| JP | S5816665 | U | 2/1983 |
| JP | S5875183 | A | 5/1983 |
| JP | S5974948 | U | 5/1984 |
| JP | S62198699 | U | 12/1987 |
| JP | H01500842 | A | 3/1989 |
| JP | 2004070361 | A | 3/2004 |
| JP | 2010540286 | A | 12/2010 |
| WO | 06030037 | A1 | 3/2006 |
| WO | 07145386 | A1 | 12/2007 |
| WO | 2017059348 | A1 | 4/2017 |

* cited by examiner

DUNNAGE APPARATUS WITH STATIC REMOVER

CROSS-REFERENCE TO RELATED APPLICATIONS

The present application is a continuation of U.S. patent application Ser. No. 15/592,646, filed May 11, 2027, which is incorporated herein by reference in its entirety.

TECHNICAL FIELD

This invention is in the field of protective packaging systems.

BACKGROUND

In the context of paper-based protective packaging, stock material (e.g., paper stock material) is crumpled to produce dunnage. Most commonly, this type of dunnage is created by running a generally continuous strip of paper into a dunnage conversion machine that converts compact stock material, such as a roll of paper or a fanfold stack of paper, into a lower density dunnage material. The material is pulled into the conversion machine from a supply, such as a stack of fanfold paper, which is either continuously formed or formed with discrete sections connected together. The continuous strip of crumpled sheet material may be cut into desired lengths to effectively fill void space within a container holding a product. The dunnage material may be produced on an as-needed basis for a packer.

When the material is removed from the supply of material, static can accumulate on the material. For example, when a portion of material is separated from an abutting portion of the material in the supply, protons and electrons move between the surfaces of these portions, thus creating static. Also, static buildup can occur when material is being converted into dunnage. During the converting process, as the material comes into and out of contact with the components of the dunnage machine, the protons and electrons of the material move between the protons and electrons of the dunnage machine, thus creating static. When a packer contacts produced dunnage that has a buildup of static, it can produce an electrostatic shock to the packer, thus causing discomfort to the packer and disrupting the packaging process. Needed is a way to reduce static buildup from the material.

SUMMARY

In embodiments, provided is a dunnage apparatus, comprising a converting station and a static remover. The converting station converts a line of high-density stock material into low density dunnage and moves the dunnage along a material path in a downstream direction. The static remover is electrically grounded and contacts the dunnage to thereby remove static buildup from the material.

In some embodiments, provided is a method, comprising converting a line of high-density stock material into low density dunnage, moving the dunnage along a material path, and contacting the dunnage by an electrically grounded static remover to remove static buildup from the material.

BRIEF DESCRIPTION OF THE DRAWINGS

The drawing figures depict one or more implementations in accordance with the present concepts, by way of example only, not by way of limitations. In the figures, like reference numerals refer to the same or similar elements.

DETAILED DESCRIPTION

Figure 1A:
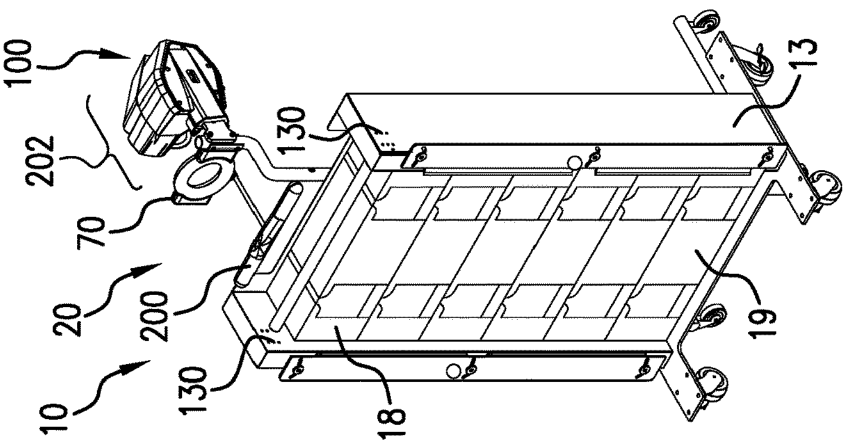
FIG. 1A is a perspective view of an embodiment of a dunnage conversion system that includes a supply cart holding stock material and a dunnage conversion system having a static remover.

Disclosed is a dunnage apparatus for converting stock material into dunnage. More particularly, the dunnage apparatus includes a static remover that removes static buildup from the material. The present disclosure is generally applicable to systems and apparatus where stock material, such as a paper stock material, is processed.

The stock material 19 may be stored in a bulk supply 18, as a roll (whether drawn from inside or outside the roll), a wind, a fan-folded source, or any other form. The stock material may be continuous or perforated. The dunnage apparatus includes a converting station that is operable to drive the stock material in a first direction, which can be the dispensing direction. The converting station is fed the stock material from the repository through a drum in the dispensing direction. The stock material can be any suitable type of protective packaging material, including dunnage and void fill materials, inflatable packaging pillows, etc. Some embodiments use supplies of paper or other fiber-based materials in sheet form, and some embodiments use supplies of wound fiber material, such as ropes or thread, and thermoplastic materials such as a web of plastic material usable to form pillow packaging material. The dunnage material 21 is converted from stock material 19, which is delivered from a bulk material supply 61 and delivered to the converting station 202 for converting to dunnage material 21 and through the drive mechanism 250 and the cutting edge 120.

The converting station can have a cutting mechanism, such as cutting edge 120, operable to cut the dunnage material. In some embodiments, the cutting mechanism is used with no or limited user interaction. For example, the cutting mechanism punctures, cuts, or severs the dunnage material without the user touching the dunnage material or with only minor contact of the dunnage material by the user. Specifically, a biasing member is used to bias the dunnage material against or around a cutting member to improve the ability of the system to sever the dunnage material. The biased position of the dunnage material is used in connection with or separately from other cutting features such as reversing the direction of travel of the dunnage material.

With reference to FIGS. 1A, 1B, 1C, and 2, a dunnage conversion system 10 is disclosed for processing stock material 19. In accordance with various embodiments, the dunnage conversion system 10 includes intake 70 that receives the stock material 19 from a supply station 13, which contains a bulk supply 18. The drive mechanism 250 is able to pull or assist in pulling the stock material 19 into the intake 70. In some embodiments, the stock material 19 engages a shaping member 200 prior to the intake 70. The drive mechanism 250, in conjunction with edge 120, can assist a user in cutting or severing dunnage material 21 at a desired point.

Figure 1B:
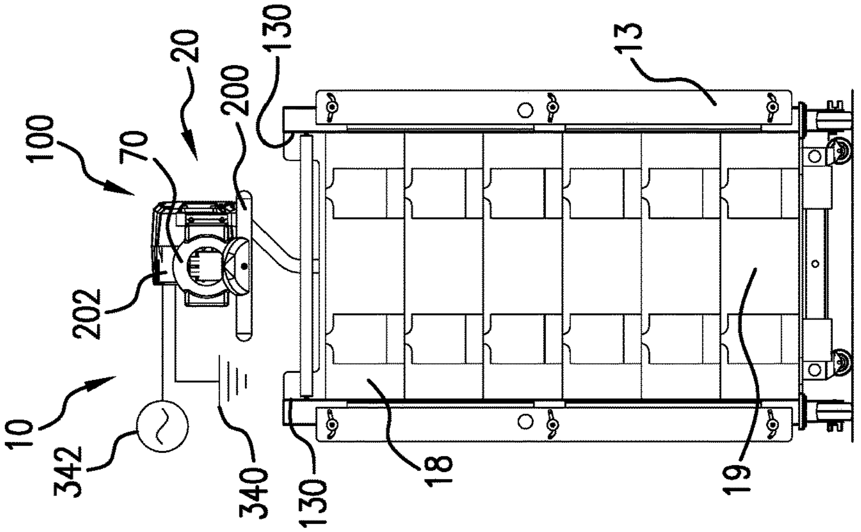
FIG. 1B is a rear view of the dunnage conversion system of FIG. 1A, showing a schematic representation of electrical connections.

In accordance with various examples, as shown in FIGS. 1A and 1B, the stock material 19 is allocated from a bulk supply 18. The stock material 19 can be stored as stacked bales of fan-fold material. As indicated above, however, any other suitable type of supply or stock material may be used. The bulk supply 18 of stock material 19 can be contained in the supply station 13. In one example, the supply station 13 is a cart movable relative to the dunnage conversion system 10. The cart supports a magazine 130 suitable to contain the stock material 19. In other examples, the supply station 13 is not moveable relative to the dunnage conversion system 10. For example, the supply station 13 may be a single magazine, basket, or other container mounted to or near the dunnage conversion system 10.

The stock material 19 is fed from the supply side 61 through the intake 70. The stock material 19 begins being converted from dense stock material 19 to less dense dunnage material 21 by the intake 70 and then pulled through the drive mechanism 250 and dispensed out direction A on the out-feed side 62 of the intake 70. The material can be further converted by the drive mechanism 250 by allowing rollers or similar internal members to crumple, fold, flatten, or perform other similar methods that further tighten the folds, creases, crumples, or other three dimension structure created by intake 70 into a more permanent shape creating the low-density configuration of dunnage material. The stock material 19 can include continuous (e.g. continuously connected stacks, rolls, or sheets of stock material), semi-continuous (e.g. separated stacks or rolls of stock material), or non-continuous (e.g. single discrete or short lengths of stock material) stock material 19 allowing for continuous, semi-continuous or non continuous feeds into the dunnage conversion system 10. Multiple lengths can be daisy-chained together. Further, it is appreciated that various structures of the intake 70 on longitudinal crumpling machines can be used, such as those intakes forming a part of the converting stations disclosed in U.S. Pat. Pub. No. 2013/0092716, U.S. Publication 2012/0165172, U.S. Publication No 2011/0052875, and U.S. Pat. No. 8,016,735. Examples of cross crumpling machines include U.S. Pat. No. 8,900,111.

In one configuration, the dunnage conversion system 10 can include a support portion 12 for supporting the station. In one example, the support portion 12 includes an inlet guide 70 for guiding the sheet material into the dunnage conversion system 10. The support portion 12 and the inlet guide 70 are shown with the inlet guide 70 extending from the post. In other embodiments, the inlet guide may be combined into a single rolled or bent elongated element forming a part of the support pole or post. The elongated element extends from a floor base configured to provide lateral stability to the converting station. In one configuration, the inlet guide 70 is a tubular member that also functions as a support member for supporting, crumpling and guiding the stock material 19 toward the drive mechanism 250. Other inlet guide designs such as spindles may be used as well.

In accordance with various embodiments, the advancement mechanism is an electromechanical drive such as an electric motor 11 or similar motive device. The motor 11 is connected to a power source, such as an outlet via a power cord, and is arranged and configured for driving the dunnage conversion system 10. The motor 11 is an electric motor in which the operation is controlled by a user of the system, for example, by a foot pedal, a switch, a button, or the like. In various embodiments, the motor 11 is part of a drive portion, and the drive portion includes a transmission for transferring power from the motor 11. Alternatively, a direct drive can be used. The motor 11 is arranged in a housing and is secured to a first side of the central housing, and a transmission is contained within the central housing and operably connected to a drive shaft of the motor 11 and a drive portion, thereby transferring motor 11 power. Other suitable powering arrangements can be used.

Figure 1C:
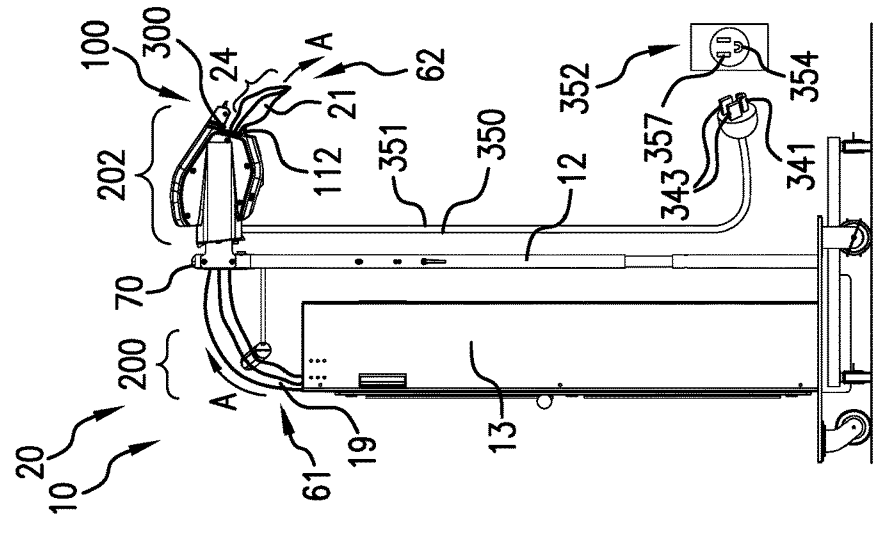
FIG. 1C is a side view of the dunnage conversion system of FIG. 1A, showing an embodiment of an electrical plug.
Figure 2:
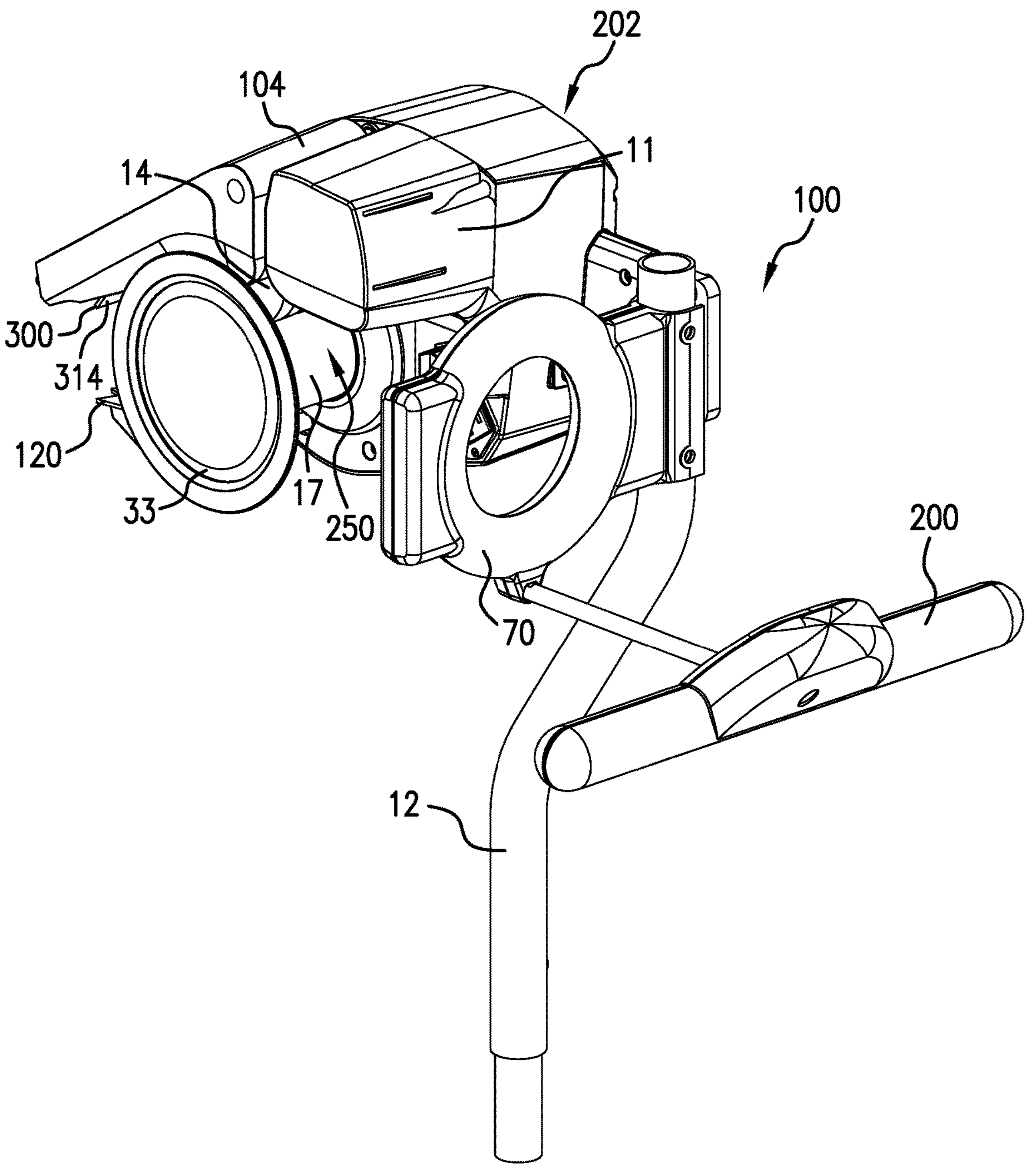
FIG. 2 is a perspective view of the dunnage machine of FIG. 1A.

The motor 11 is mechanically connected either directly or via a transmission to a drum 17, shown in FIG. 2, which causes the drum 17 to rotate with the motor 11. During operation, the motor 11 drives the drum 17 in either a dispensing direction or a reverse direction (i.e., opposite of the dispensing direction). Drum 17 drives dunnage along material path to dispense the dunnage material, depicted as arrows "A" in FIG. 1C, or withdraws the dunnage material 21 back into the conversion machine in the direction opposite thereof. The stock material 19 is fed from the supply side 61 of the intake 70 and over the drum 17, forming the dunnage material 21 that is driven in the dispensing direction when the motor 11 is in operation. While described herein as a drum, this element of the driving mechanism may also be wheels, conveyors, belts or any other device operable to advance stock material or dunnage material through the system.

In accordance with various embodiments, the dunnage conversion system 10 includes a pinch portion operable to press on the material as it passes through the drive mechanism 250. As an example, the pinch portion includes a pinch member such as a wheel, roller, sled, belt, multiple elements, or other similar member. In one example, the pinch portion includes a pinch wheel 14. The pinch wheel 14 is supported via a bearing or other low friction device positioned on an axis shaft arranged along the axis of the pinch wheel 14. In some embodiments, the pinch wheel can be powered and driven. The pinch wheel 14 is positioned adjacent to the drum such that the material passes between the pinch wheel 14 and the drum 17. In various examples, the pinch wheel 14 has a circumferential pressing surface arranged adjacent to or in tangential contact with the surface of the drum 17. The pinch wheel 14 may have any suitable size, shape, or configuration. Examples of size, shape, and configuration of the pinch wheel may include those described in U.S. Pat. Pub. No. 2013/0092716 for the press wheels. In the examples shown, the pinch wheel 14 is engaged in a position biased against the drum 17 for engaging and crushing the stock material 19 passing between the pinch wheel 14 and the drum 17 to convert the stock material 19 into dunnage material 21. The drum 17 or the pinch wheel 14 is connected to the motor 11 via a transmission (e.g., a belt drive or the like). The motor 11 causes the drum or the pinch wheel 14 to rotate.

In accordance with various embodiments, the drive mechanism 250 may include a guide operable to direct the material as it is passes through the pinch portion. In one example, the guide may be a flange 33 mounted to the drum 17. The flange 33 may have a diameter larger than the drum 17 such that the material is kept on the drum 17 as it passes through the pinch portion.

The drive mechanism 250 controls the incoming dunnage material 19 in any suitable manner to advance it from a conversion device to the cutting member. For example, the pinch wheel 14 is configured to control the incoming stock material. When the high-speed incoming stock material diverges from the longitudinal direction, portions of the stock material contacts an exposed surface of the pinch wheels, which pulls the diverging portion down onto the drum and help crush and crease the resulting bunching material. The dunnage may be formed in accordance with any techniques including ones referenced to herein or ones known such as those disclosed in U.S. Pat. Pub. No. 2013/0092716.

In accordance with various embodiments, the conversion apparatus 10 can be operable to change the direction of the stock material 19 as it moves within the conversion apparatus 10. For example, the stock material is moved by a combination of the motor 11 and drum 17 in a dispensing direction (i.e., from the inlet side to the dispensing side) or a reverse direction (i.e., from the dispensing side to the supply side 61 or direction opposite the dispensing direction). This ability to change direction allows the drive mechanism 250 to cut the dunnage material more easily by pulling the dunnage material 19 directly against an edge 120. As, the stock material 19 is fed through the system and dunnage material 21 it passes over or near a cutting edge 120 without being cut.

Preferably, the cutting edge 120 can be curved or directed downward so as to provide a guide that deflects the material in the out-feed segment of the path as it exits the system near the cutting edge 120 and potentially around the edge 120. The cutting member 120 can be curved at an angle similar to the curve of the drum 17, but other curvature angles could be used. It should be noted that the cutting member 120 is not limited to cutting the material using a sharp blade, but it can include a member that causes breaking, tearing, slicing, or other methods of severing the dunnage material 21. The cutting member 120 can also be configured to fully or partially sever the dunnage material 21.

In various embodiments, the transverse width of the cutting edge 120 is preferably about at most the width of the drum 17. In other embodiments, the cutting edge 120 can have a width that is less than the width of the drum 17 or greater than the width of the drum 17. In one embodiment, the cutting edge 120 is fixed; however, it is appreciated that in other embodiments, the cutting edge 120 could be moveable or pivotable. The edge 120 is oriented away from the driving portion. The edge 120 is preferably configured sufficient to engage the dunnage material 21 when the dunnage material 21 is drawn in reverse. The edge 120 can comprise a sharp or blunted edge having a toothed or smooth configuration, and in other embodiments, the edge 120 can have a serrated edge with many teeth, an edge with shallow teeth, or other useful configuration. A plurality of teeth are defined by having points separated by troughs positioned there between.

Generally, the dunnage material 21 follows a material path A as shown in FIG. 1C. As discussed above, the material path A has a direction in which the material 19 is moved through the system. The material path A has various segments such as the feed segment from the supply side 61 and severable segment 24. The dunnage material 21 on the out-feed side 62 substantially follows the path A to the edge 120. The edge 120 provides a cutting location at which the dunnage material 21 is severed. The material path A can be bent over the edge 120.

As discussed above, any suitable stock material may be used. For example, the stock material may have a basis weight of about at least 20 lbs., to about at most 100 lbs. Examples of paper used include 30 pound kraft paper. The stock material 19 comprises paper stock stored in a high-density configuration having a first longitudinal end and a second longitudinal end that is later converted into a low-density configuration. The stock material 19 can be a ribbon of sheet material that is stored in a fan-fold structure, as shown in FIG. 1A, or in coreless rolls. The stock material is formed or stored as single-ply or multiple plies of material. It is also appreciated that other types of material can be used, such as pulp-based virgin and recycled papers, newsprint, cellulose and starch compositions, and poly or synthetic material, of suitable thickness, weight, and dimensions.

In various embodiments, the stock material includes an attachment mechanism such as an adhesive portion that is operable as a connecting member between adjacent portions of stock material. Preferably, the adhesive portion facilitates daisy-chaining the rolls together to form a continuous stream of sheet material that can be fed into the converting station 70.

Static Remover

The dunnage apparatus 20 includes a static remover 300 that removes from the material 19 static buildup, which can collect when positive or negative charges collect on the material's surface.

The buildup of static can occur as the material 19 is removed from the bulk supply 18 of stock material and fed into the dunnage machine 100. For example, when a portion of stock material 19 is separated from an abutting portion of material in the bulk supply 18, protons and electrons move between the surfaces of these portions, thus creating static.

Static buildup can also occur when the material 19 is being converted into dunnage. During the converting process, as the material 19 comes into and out of contact with the components of the dunnage machine 100, the protons and electrons of the material 19 move between the protons and electrons of the dunnage machine 100, thus creating static. The various components of the dunnage machine 100 may be non-conductive. For example, the converting station 202 may be non-conductive. The supply station may be non-conductive. Additionally, the components of these systems may be non-conductive such as the housings thereof, the drum, pinch wheel, intake, etc. For example, as the material 19 is being converted, it rubs against the pinch wheel 14 and the drum 17, which can produce static. Static buildup can particularly occur in embodiments in which the material 19 is made of non-conductive material, and contacts surfaces of the converting machine that are also made of non-conductive material. For example, at least one of the pinch wheel 14 or the drum 17 can have surfaces that contact the material during the converting process and which are made of non-conductive material.

Static can build up on the material 19 as an excess of electrons, thus creating a negatively charged material, or as an excess of protons, thus creating a positively charged material 19. The static remover 300 provides a conducting pathway between the dunnage material 19 and ground, thus operating to remove static from both negatively and positively charged material 119. The static remover 300 removes a sufficient amount of static from the material so that a user can grab the produced dunnage without typically being electrically shocked.

In the embodiment shown in FIGS. 1A-8B, the static remover 300 extends into the material path of the dunnage 21 so to contact the dunnage 21 and remove static therefrom. The static remover can be disposed proximate the exit 112 of the converting station 202 to remove static from dunnage 21 as it is ejected therefrom.

Figure 3B:
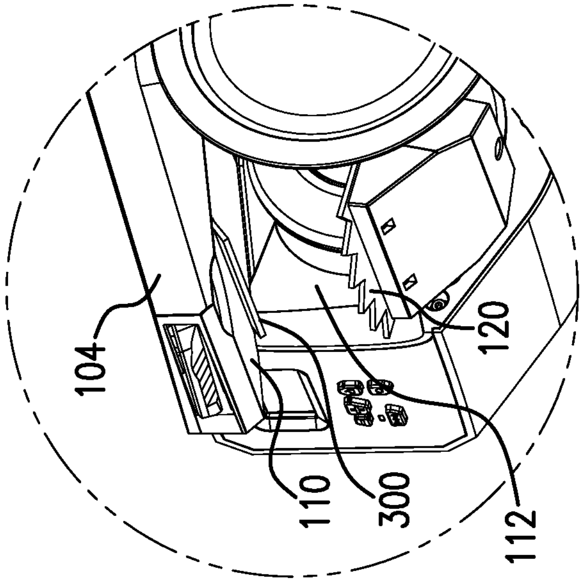
FIG. 3B is a close-up perspective view of portion A in FIG. 3A.
Figure 3A:
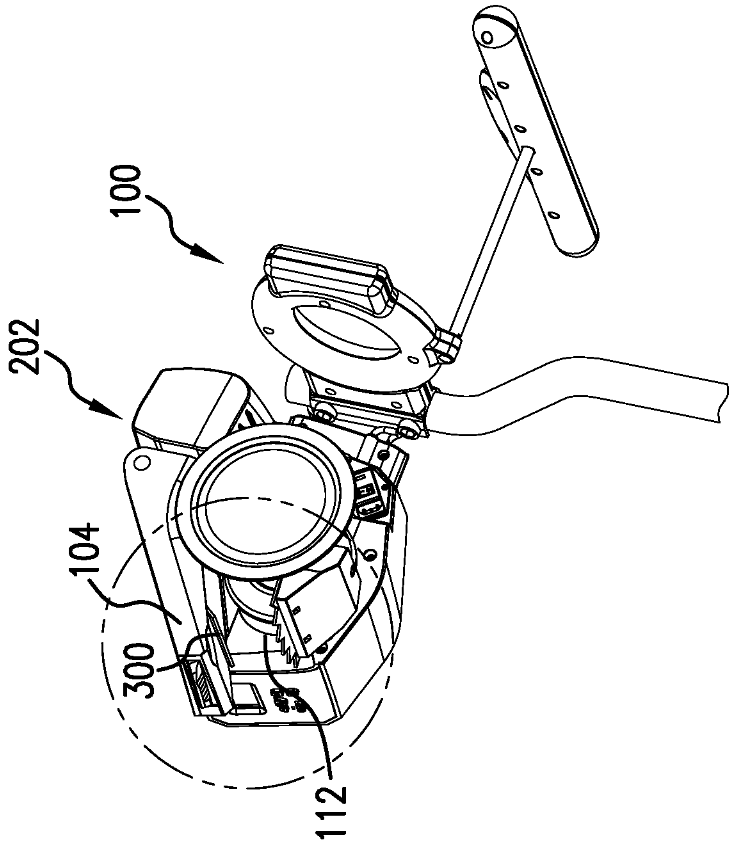
FIG. 3A is a perspective view of the dunnage machine of FIG. 1A.
Figure 4:
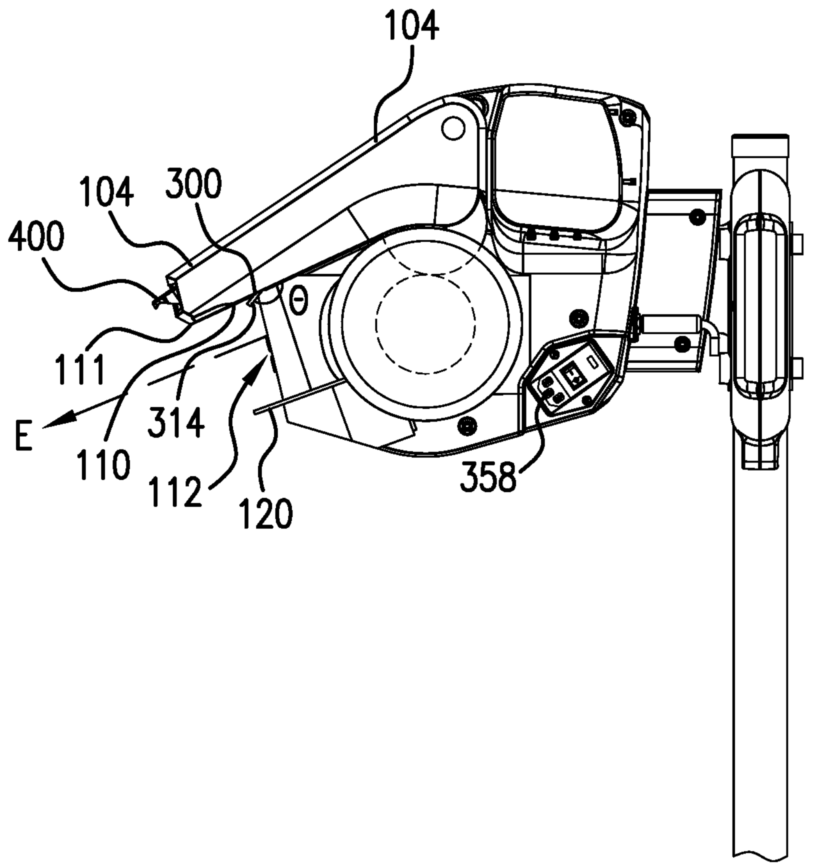
FIG. 4 is a side view of the dunnage machine of FIG. 1A.

As shown in FIGS. 3A-4, housing 104 of converting station 202 can include a wall 110 proximate the exit 112. The static remover 300 can extend from the wall 110 and into the material path, so to contact the dunnage 21. Wall 110 can define an opening 114 through which static remover 300 extends, from the interior to the exterior of the housing 104. Preferably, the static remover 300 is located upstream of cutting member 120, and thus sufficiently removes static from the dunnage 21 before a user grasps the dunnage 21 to cut it against cutting member. For example, the static remover 300 can be disposed to sufficiently remove static from a portion of the dunnage prior to the converting station moving the portion of dunnage 21 to the cutting member 120.

As shown in FIG. 4, the static remover 300 can be configured so that the dunnage 21 contacts an inner side 314 of the static remover 300. For example, the dunnage 21 can glide against a contact side 314 of the static remover 300 as the dunnage 21 moves through the exit.

As shown in FIG. 4, the side 314 of the static remover 300 can extend downstream with respect to the material path and downward with respect to the material path A, thus forming Angle θ with respect to lower wall 110. The value of Angle θ can be between 91 and 179 degrees, for example, between 100 and 165 degrees. Preferably, Angle θ is between 125 and 145 degrees. The lower wall 110 can extend substantially parallel to the E-direction, which is the direction in which the dunnage 21 travels as it exits the converting station 202. Thus, the contact side 314 can also extend at Angle θ with respect to the E-direction.

In some embodiments, the E-direction is the direction that the dunnage is traveling at the last place of contact within the converting station. In some embodiments, the E-direction is the direction the dunnage travels after being deflected off of lower wall 110 of the converting station. In some embodiments, the E-direction is the direction of the tangent between the crumpling rollers (e.g., pinch wheel 14 and drum 17), or the direction in which the dunnage leaves the elements of the converting station that convert the stock material into dunnage, or that move the dunnage out of the dunnage machine.

The static remover 300 is configured to make sufficient contact with the dunnage 21 in order to remove static therefrom. The converting station 202 can eject the dunnage 21 at exit in an exit trajectory TE along the path; and the static remover 300 can be positioned to contact dunnage 21 as it moves along the path.

Figure 5A:
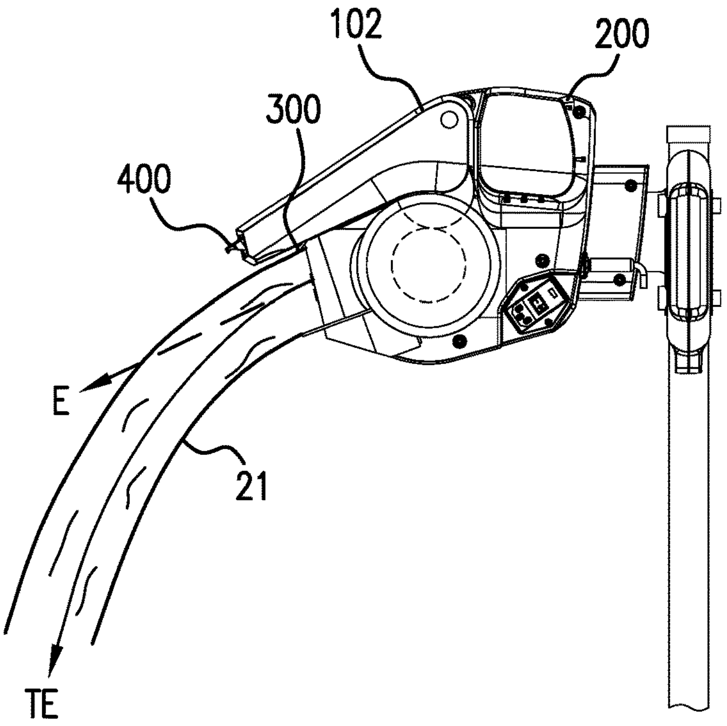
FIGS. 5A and 5B are side views of the dunnage machine of FIG. 1A operating with the dunnage deflector in retracted and deflected positions, respectively.
Figure 5B:
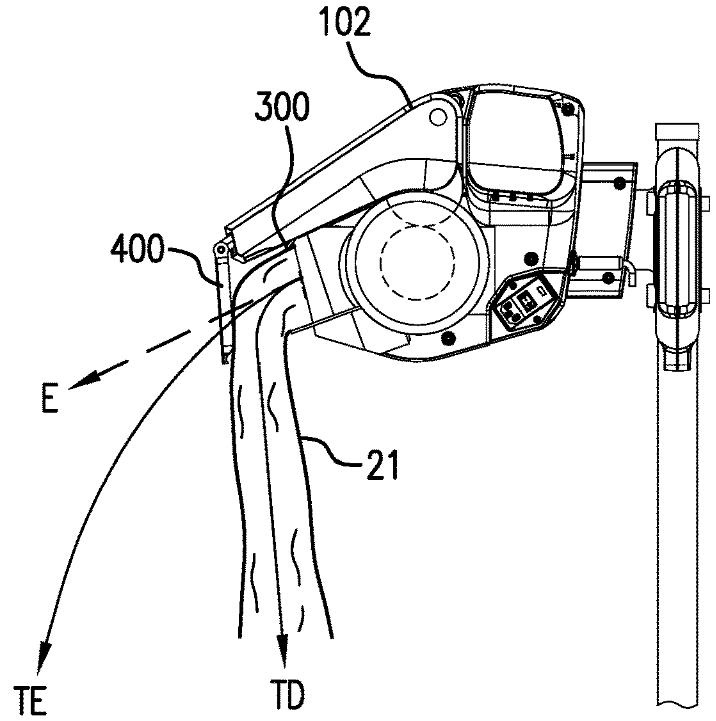

The dunnage machine 100 can comprise a dunnage deflector 400 that deflects the path of the dunnage 21. As shown in FIGS. 5A and 5B, respectively, the dunnage deflector 400 can be repositionable with respect to the exit between a removed position and a deflecting position. FIG. 5A shows deflector 400 in a removed position, in which the deflector 400 is disposed out of the path to avoid deflecting the dunnage. FIG. 5B shows deflector 400 in a deflecting position, in which deflector 400 is interposed in the path to deflect the dunnage 21, and thus change the trajectory of the dunnage. For example, the deflector 400 can change the path of the dunnage from the exit trajectory TE to a deflected trajectory TD. Further details of a dunnage deflector are provided in U.S. patent application Ser. No. 11/034,121, entitled "Dunnage Apparatus Carton," which is hereby incorporated by reference in its entirety.

As shown in FIG. 5A, in some instances, the static remover 300 contacts the dunnage 21 without interrupting the path of the dunnage 21 (e.g., without bending the path of the dunnage 21). The static remover 300 can be configured to contact dunnage 21 sufficiently to remove static, without changing the trajectory of the dunnage 21. For example, the static remover 300 can be configured so that the dunnage glides against contact side 314 of the static remover 300.

In other instances, the static remover 300 contacts the dunnage 21 and bends the path of the dunnage 21. The static remover can be interposed in the path to deflect the path of the dunnage 21 from the exit trajectory to a deflected trajectory.

In instances in which both the static remover 300 and deflector 400 are interposed in the path of the dunnage 21, the static remover 300 can deflect the dunnage path from the exit trajectory to a first deflected trajectory, and the deflector 400 can deflect the dunnage path from the first deflected trajectory to a second deflected trajectory. Additionally or alternatively, the interposition of both the static remover 300 and the deflector 400, together in the dunnage path, operates to deflect the dunnage from the exit trajectory to a deflected trajectory.

Deflection of the dunnage, by one or more of the static remover 300 or the deflector 400, can direct the dunnage into a packaging container, thereby facilitating the packaging process.

While the embodiment of the static remover shown in FIGS. 1A-8B is disposed above the exit 112, the static remover 300 can be disposed at other suitable locations at or near the exit 112 while remaining within the scope of this disclosure. Also, while the embodiment of the static remover 300 shown in FIGS. 1A-8B comprises a single component, the static remover 300 can comprise two, three, or any suitable number of components.

The static remover 300 is made of any suitable conductive material. For example the static remover 300 can be made of nylon and carbon. The static remover 300 can be made of a greater percentage of nylon than carbon. For example, the static remover 300 can be made of 75-85% nylon and 15-25% carbon, for example 80% nylon and 20% carbon.

Figure 6A:
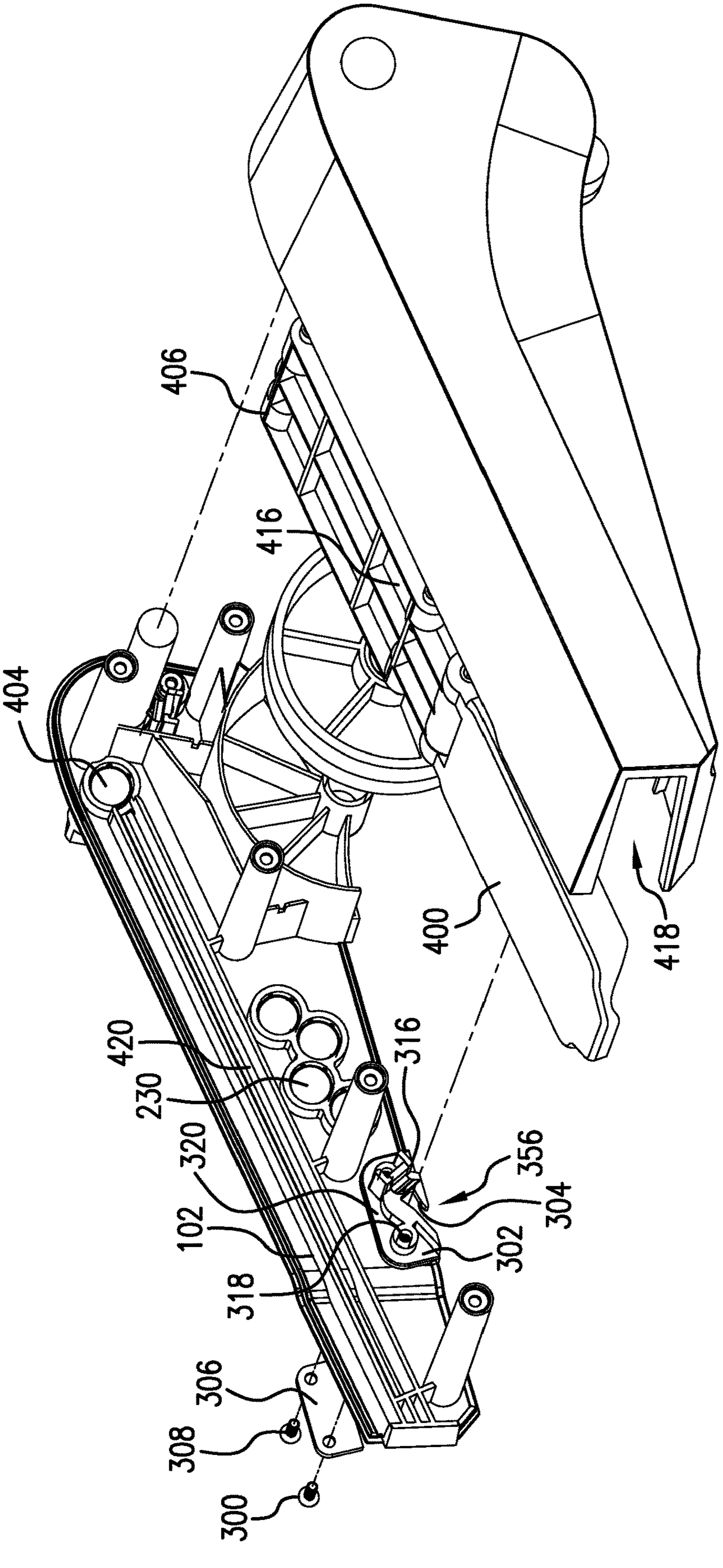
FIGS. 6A and 6B are exploded perspective views of the dunnage machine of FIG. 1A.
Figure 6C:
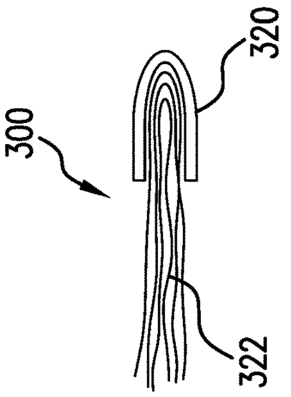
FIG. 6C is a side view of the static control device of FIG. 1A.
Figure 6B:
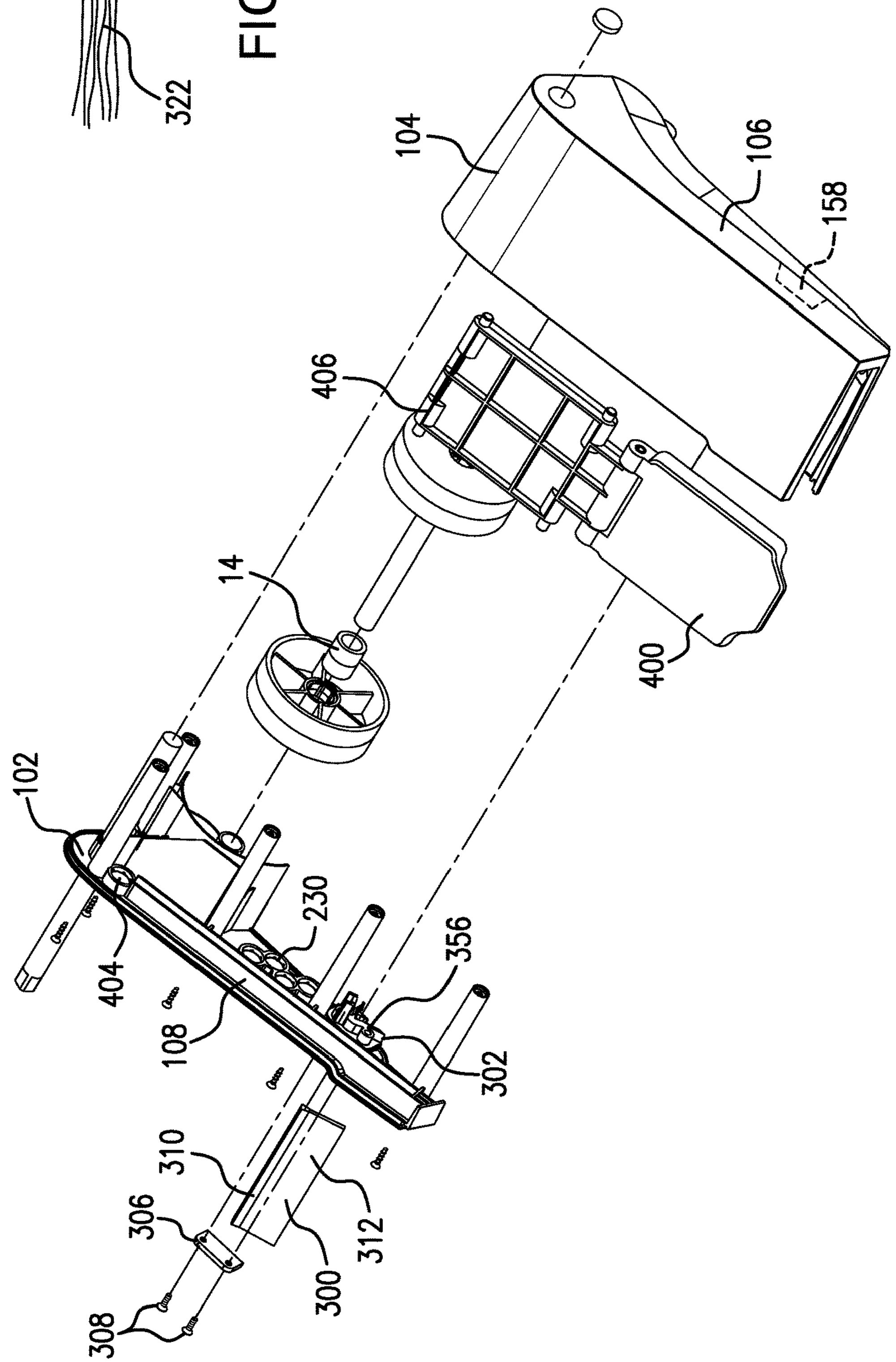
Figure 7A:
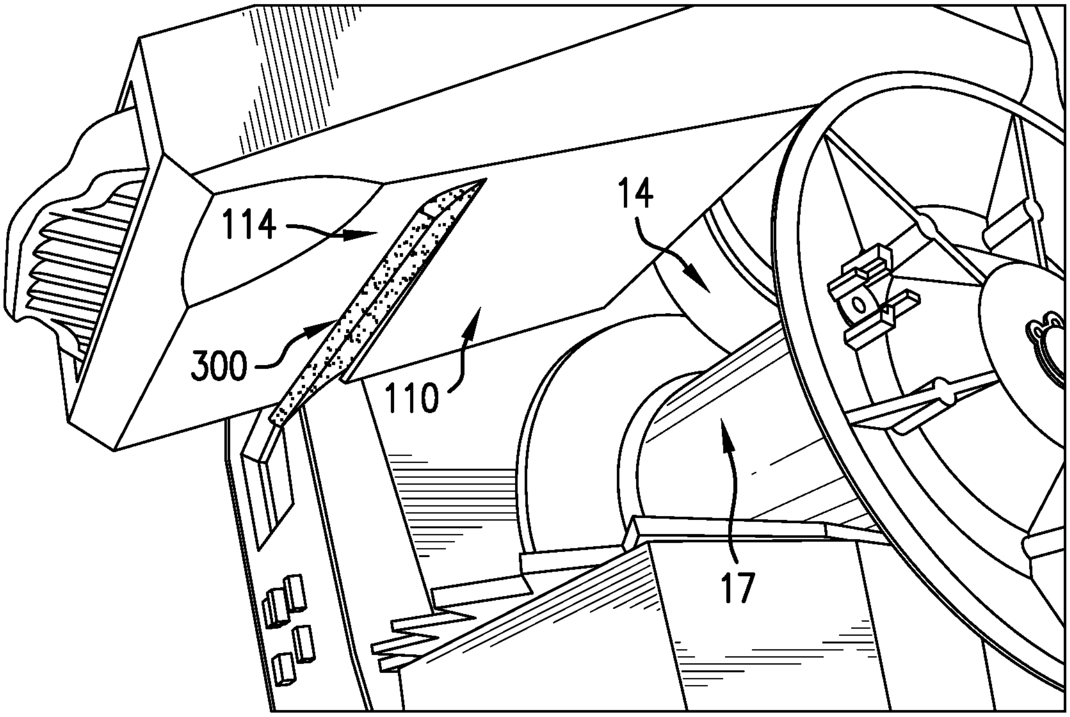
FIG. 7A is a close-up perspective view of the dunnage machine of FIG. 1A.
Figure 7B:
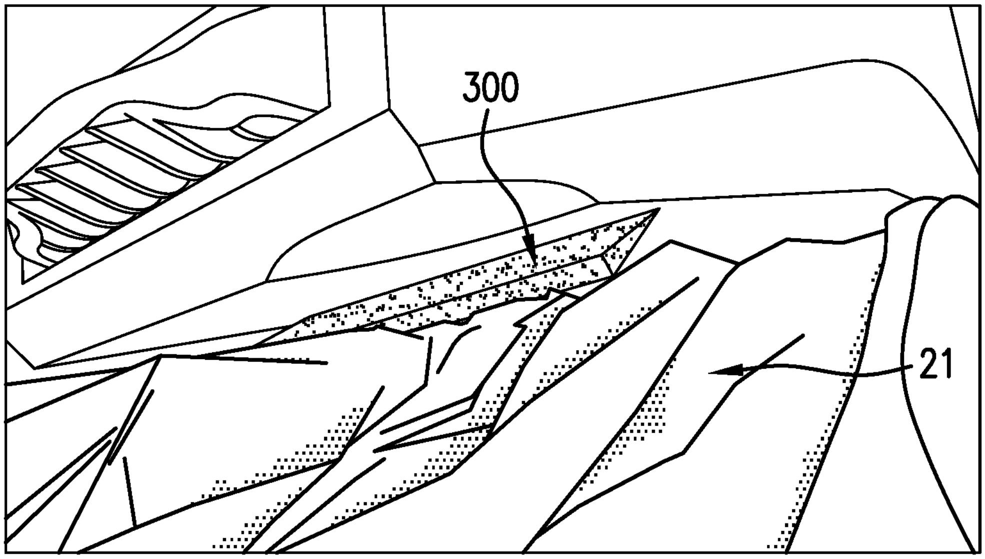
FIG. 7B is a close-up perspective view of the dunnage machine of FIG. 1A ejecting dunnage.

As shown in FIGS. 4, 6A and 6B, a chassis ground 356 can electrically connect the static remover 300 to one or more conductive portions of the converting station 202. For example, the static remover 300 can be electrically connected to ground outlet 358 via converting station frame 102. The converter station frame 102 can be made of a conducting material. Additionally or alternatively, conductive wires can extend from chassis ground 356 to ground outlet 358.

Static remover 300 can be attached to frame 102 by any suitable means, in order to provide an electrical connection therebetween. As shown in FIGS. 6A and 6B, one or more lugs 308 made of conductive material can be used to attach the static remover 300 to the frame 102. An attachment piece 302 can be configured to receive the conductive lugs 308 and the static remover 300, thus providing electrical connection therebetween. The attachment piece 302 can have one or more apertures 310 configured to receive the lugs 308, and a slot 304 configured to receive the static remover 300. The attachment piece 302 can receive static remover 300 within slot 304 in a seated arrangement. The static remover 300 can be held in place within slot 304 by any suitable means, such as by a friction fit, an adhesive, and/or a mechanical fastener. An exterior attachment portion 306 can be disposed on the exterior of housing 104 for receiving one or more lugs 308. FIG. 6B shows a corresponding piece 158, e.g., a seat, provided on the interior of right housing wall for engaging static remover.

Referring to FIGS. 6A-6C, the illustrated embodiment shows a static remover 300 configured as a brush. Spine 320 extends transversely with respect to the material path, preferably extending most of all of the way across the path, from attachment piece 302 provided on frame 102, to corresponding attachment piece 358 provided on right wall 106 of housing 104. Preferably, spine 320 is made of conductive material. Bristles 322 extend from the spine in a downstream direction with respect to the material path. Further discussion of the brush is provided below with reference to FIGS. 7A and 7B.

The static remover 300 can provide a conducting pathway between the dunnage material 19 and the earth. The static remover 300 can be grounded to the earth in various suitable ways, in order to provide a conducting pathway between the dunnage 21 and the earth. In some embodiments, the static remover 300 is grounded to the earth by way of being electrically connecting to the converting station 202 by a chassis ground. For example, chassis ground 356 electrically connects the static remover 300 to the converting station 202; and the converting station 202 is grounded to the earth. For example, grounding wire 350 can extend from plug 358 on the converting station (FIG. 4) to ground prong 341, and into ground connection 354 in socket 352 and electrically connect, via wires, to an earth ground (FIG. 1C). In some embodiments, the wire 350 that grounds the static remover 300 also grounds other components of the converting station 202 (e.g., motor 11) to the earth. In some embodiments, the deflector 400 is grounded. Additionally or alternatively, the cutting edge 120 can be grounded.

The converting station 202 can be operated by any suitable type of motor 11. The motor 11 can operate by way of direct current or alternating current of two or more phases. For example, motor 11 can be a two-phase electric power motor, having a three wire output, two of the wires carrying alternating current of the same frequency but with a phase difference, and the third wire being an earth ground. As another example, motor 11 can be a three-phase electric power motor, having a four wire output, three of the wires carrying alternating current of the same frequency but with a phase difference and the fourth wire being an earth ground.

FIG. 1B shows a schematic representation of the electrical connections for the converting station 202, including a power connection 342 and a common or ground connection 340. FIG. 1C shows an embodiment of a socket 352, including power connection 357 and ground connection 354. In cases in which motor 11 is a two phase motor, two wires 351 extend from plug 358 of converting station 202 to two power prongs 343 of plug and into power connection 357 of socket 352; and ground wire 350 extends from plug 358 of converting station 202 to ground prong 341 of plug and into ground connection 354 of socket 352.

In some embodiments, static remover 300 is grounded to one or more conductive portions of the converting station 202 (e.g., the converting station frame 102) by a chassis ground 356 and is not grounded to the earth. For example, the conductive frame 102 can act as the dissipation path for the static.

In embodiments in which the dunnage machine 100 comprises a dunnage deflector 400, the machine 100 can be configured so that dunnage material contacts the static remover 300 to sufficiently remove static from the material, prior to the material contacting and being deflected by deflector 400. For example, the dunnage deflector 400 can be disposed downstream with respect to the static remover 300.

The deflector 400 can be repositionable between removed and deflected positions (e.g., FIGS. 5A and 5B) by moving deflector 400 along a guide 220, which extends over chassis ground 356. The deflector 400 can be part of a deflection member 410 that also includes base member 416, and the deflection member 410 can slide over and downstream of static remover 300.

The static remover 300 can have various suitable configurations, including a bar, a flexible membrane, a plate, a brush, or other structures that preferably maintain contact with the dunnage passing thereby when it is ejected by the dunnage machine 100 most preferably without significantly impeding the flow of dunnage 21. In the embodiment of FIGS. 1A-8B, static remover 300 comprises a brush, having a spine 320 that supports a plurality of bristles 322 extending downstream therefrom, for example, towards the exit trajectory.

The preferred brush configuration allows the bristles 322 to move resiliently, for instance by flexing, independently to increase or maximize conductive contact with the dunnage 21 surface to more effectively removes the static from the dunnage 21. The dunnage machine 21 can be a longitudinal crumpling device that crumples the material to form longitudinal crumples extending in the machine direction. Preferably, the alignment of the bristles 322, typically angled on a plane that is generally parallel to the dunnage flow in the exit trajectory and partially downstream with respect thereto, and the resilience of the bristles 322 allow the bristles 322 to move into and in some cases follow the longitudinal creases that are made formed in the dunnage by a longitudinal crumpling device, such as the embodiment of FIGS. 2-3B.

Figure 8A:
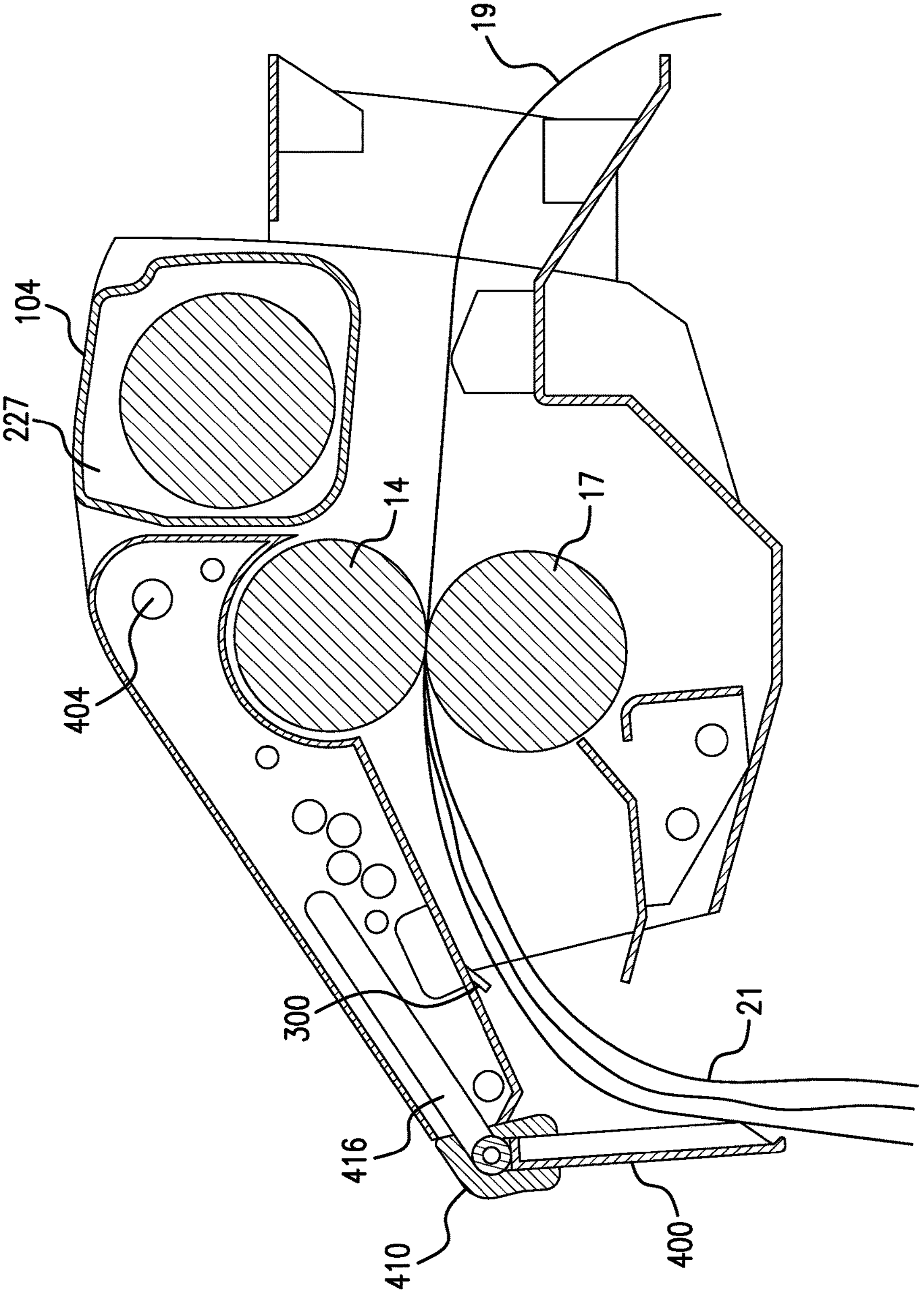
FIGS. 8A and 8B are cross-sectional views of the dunnage machine of FIG. 1A, with the pressing portion in engaged and released positions.
Figure 8B:
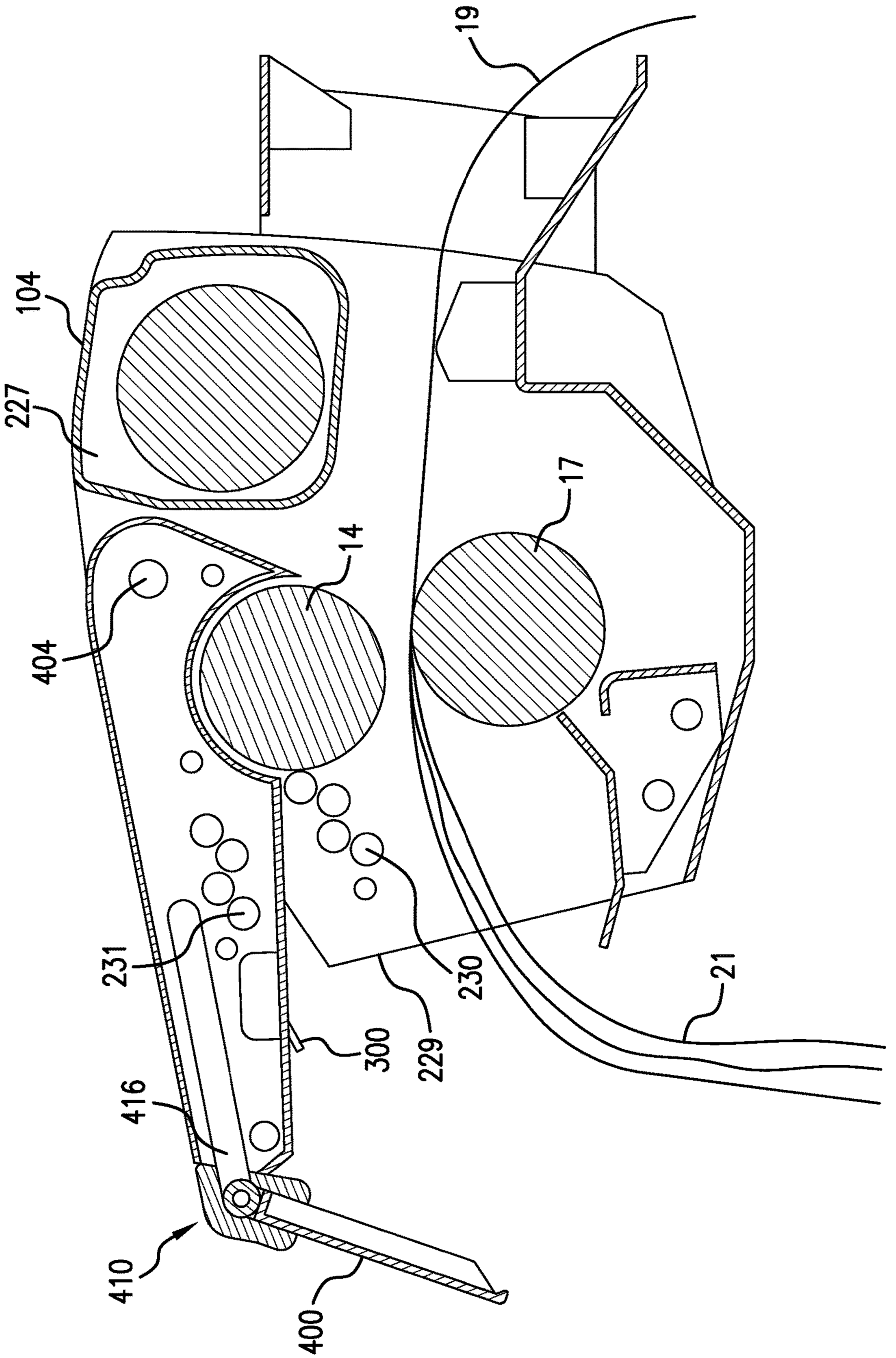

As shown in FIGS. 8A and 8B, the converting station 202 can have a pinch wheel 14 that is repositionable between an engaged position (FIG. 8A) and a released position (FIG. 8B). Converting station housing 104 can have a pressing portion 227 that houses the pinch wheel 14 biased against the drum 17 for crushing the stock material 19 passing between the pinch wheel 14 and the drum 17 to convert the stock material 19 into dunnage material 21. The pinch wheel 14 can be biased against the drum by way of a magnetic engagement. For example, a first magnetic member 231 can be arranged on the pressing portion 227 for interacting with a second magnetic member 230 on a lower housing portion 229. The first magnetic member 231 may be magnetically coupled to the second magnetic member 230 sufficiently to require a predetermined force tending to separate the pinch wheel 14 from the drum 17 to overcome the magnetic coupling. Forces tending to separate the rollers may occur, for example, if a paper jam occurs between the pinch wheel 14 and the drum 17. Once the magnetic counting is overcome, the bias of the pinch wheel 14 towards the drum 17 may be decreased or eliminated due to the proximity between the magnets decreasing. As such, removal of the jam or simply opening the device for servicing may be facilitated. Some exemplary embodiments of magnetic configurations can be found in U.S. Patent Publication No. 2012/0165172, entitled "Center-Fed Dunnage System Feed and Cutter."

The static remover 300 can be attached to the pressing portion 227, so that the static remover 300 is repositionable between engaged and released positions along with the pinch wheel 14. Thus, when the pressing portion 227 is in the released position, then the static remover 300 is also moved to provide access to the interior of the converting station, for example, to facilitate maintenance of the converting station.

In embodiments in which the converting station 202 comprises a dunnage deflector 400, the deflector 400 may be attached to the pressing portion 227, so that the deflector 400 is repositionable along with the wheel 14. For example, both the static remover 300 and the deflector 400 can both be repositionable together between engaged and releases positions along with the pinch wheel 14.

One having ordinary skill in the art should appreciate that there are numerous types and sizes of dunnage for which there can be a need or desire to accumulate or discharge according to an exemplary embodiment of the present invention. As used herein, the terms "top," "bottom," and/or other terms indicative of direction are used herein for convenience and to depict relational positions and/or directions between the parts of the embodiments. It will be appreciated that certain embodiments, or portions thereof, can also be oriented in other positions. In addition, the term "about" should generally be understood to refer to both the corresponding number and a range of numbers. In addition, all numerical ranges herein should be understood to include each whole integer within the range.

While illustrative embodiments of the invention are disclosed herein, it will be appreciated that numerous modifications and other embodiments may be devised by those skilled in the art. For example, the features for the various embodiments can be used in other embodiments. The converter having a drum, for example, can be replaced with other types of converters. Therefore, it will be understood that the appended claims are intended to cover all such modifications and embodiments that come within the spirit and scope of the present invention.

What is claimed is:

1. A method for converting dunnage, comprising:

crumpling a continuous stream of stock material having a high-density configuration to convert the stock material into crumpled dunnage having a low-density configuration;

driving the crumpled dunnage along a material path; and contacting, while the crumpled dunnage moves along the material path, the crumpled dunnage with an electrically grounded static remover to remove static buildup from the crumpled dunnage, wherein the static remover extends into the material path of the crumpled dunnage to contact the continuous stream of the crumpled dunnage and remove static therefrom.

2. The method of claim 1, further comprising deflecting, by the static remover, the dunnage ejected in the material path to a deflected trajectory.

3. The method of claim 1, further comprising positioning the static remover to avoid interrupting the material path.

4. The method of claim 1, wherein the static remover is positioned on only one side of the material path.

5. The method of claim 1, wherein the static remover extends transversely across the material path and is angled radially towards an exit trajectory to contact the dunnage in the material path as the dunnage is ejected.

6. The method of claim 1, further comprising electrically grounding the static remover by connecting to an earth ground.

7. The method of claim 1, wherein the static remover comprises a brush that contacts one or more creases of the dunnage after the dunnage is converted.

8. The method of claim 7, wherein the brush has a spine and bristles extending from the spine and into the material path.

9. The method of claim 1, further comprising severing a downstream portion of the ejected dunnage from a portion of the dunnage still held by a converting station.

10. The method of claim 9, wherein:

the dunnage is ejected from an exit of the converting station along the material path; and removing static from a portion of the dunnage prior to severing of the downstream portion by positioning the static remover with respect to the exit to contact and discharge static from the ejected dunnage.

11. The method of claim 2, supporting the stock material in a fan folded configuration prior to the stock material being converted to the dunnage.

12. The method of claim 11, further comprising pulling the stock material from the fanfolded configuration and constricting the path of the stock material and begin creasing the stock material into the dunnage to maintain a low-density configuration.

13. The method of claim 1, wherein the converting includes crumpling the stock material to form longitudinal creases.

14. The method of claim 13, wherein removing static buildup comprising causing bristles of the static remover to extend into the material path such that the bristles move into and follow the longitudinal creases.

15. The method of claim 1, wherein converting the line of stock material includes using rollers to crumple the stock material.

16. A method for converting dunnage, the method comprising:

crumpling a continuous stream of stock material having a high-density configuration to convert the stock material into crumpled dunnage having a low-density configuration;

driving the crumpled dunnage along a material path;

contacting, while the crumpled dunnage moves along the material path, the crumpled dunnage with an electrically grounded static remover to remove static buildup from the crumpled dunnage, wherein the static remover extends into the material path of the dunnage to contact the continuous stream of the crumpled dunnage and remove static therefrom;

cutting the crumpled dunnage by a cutting member to sever the dunnage; and dispensing the severed dunnage with the static buildup removed.

17. The method of claim 16, wherein converting the continuous strip of stock material includes using rollers to crumple the stock material.

18. The method of claim 16, wherein the static remover is located upstream of the cutting member.

19. The method of claim 16, wherein the static remover is positioned on only one side of the material path.

20. The method of claim 16, wherein the static remover comprises a brush that contacts one or more creases of the dunnage after the dunnage is converted.

21. A method for converting dunnage, comprising:

converting a continuous stream of stock material having a high-density configuration into dunnage having a low-density configuration that is crumpled;

driving the crumpled dunnage along a material path;

contacting, while the crumpled dunnage moves along the material path, the crumpled dunnage with an electrically grounded static remover to remove static buildup from the crumpled dunnage; and deflecting, by the static remover, the dunnage ejected in the material path to a deflected trajectory, wherein the static remover extends into the material path of the crumpled dunnage to contact the continuous stream of the crumpled dunnage and remove static therefrom.

* * * * *